United States Patent [19]

Chikugo et al.

[11] Patent Number: 4,541,304

[45] Date of Patent: Sep. 17, 1985

[54] CONNECTING ROD MADE OF FIBER REINFORCED PLASTIC MATERIAL

[75] Inventors: Kazuo Chikugo; Taku Murakami; Yorihiko Inada, all of Oyama, Japan

[73] Assignee: Kabushiki Kaisha Komatsu Seisakusho, Tokyo, Japan

[21] Appl. No.: 478,772

[22] Filed: Mar. 25, 1983

[30] Foreign Application Priority Data

Mar. 26, 1982 [JP] Japan .................................. 57-41928
Sep. 17, 1982 [JP] Japan ................................. 57-140006

[51] Int. Cl.⁴ ............................................. F16C 7/00
[52] U.S. Cl. .............................. 74/579 E; 29/156.5 A; 123/197 AB
[58] Field of Search ............. 74/579 R, 579 E, 579 F, 74/581, 44; 29/156.5 A; 123/197 AB, 197 R, 197 AC; 92/187; 428/105, 107, 108, 109, 113, 910

[56] References Cited

U.S. PATENT DOCUMENTS

| | | | |
|---|---|---|---|
| 1,130,982 | 3/1915 | Kinkead | 74/579 E |
| 2,428,602 | 10/1947 | Yingling | 74/579 E |
| 3,822,609 | 7/1974 | Kotoc | 74/579 E |
| 4,216,682 | 8/1980 | Ban et al. | 74/579 E |
| 4,329,915 | 5/1982 | Schulz | 29/156.5 A |
| 4,408,380 | 10/1983 | Schaper et al. | 74/579 E |
| 4,414,860 | 11/1983 | Brunsch et al. | 74/579 E |
| 4,425,820 | 1/1984 | Swozil | 74/579 E |

FOREIGN PATENT DOCUMENTS

| | | | |
|---|---|---|---|
| 1198613 | 8/1965 | Fed. Rep. of Germany | 74/579 E |
| 981446 | 1/1965 | United Kingdom | 74/579 E |
| 2078337 | 1/1982 | United Kingdom | 74/579 R |

Primary Examiner—Gary L. Smith
Assistant Examiner—Vinh Luong
Attorney, Agent, or Firm—Armstrong, Nikaido, Marmelstein & Kubovcik

[57] ABSTRACT

A connecting rod has at one end thereof two leg portions formed in forked configuration defining therebetween an intermediate groove having a recess of semi-circular cross section on the inside thereof and having oppositely located bolt insertion holes at the leading ends thereof, respectively. In the other side of the intermediate groove is fitted a block having a semi-circular recess defining a crankshaft bearing hole in opposed relationship with said semi-circular recess of the intermediate groove and having a bolt insertion hole formed therethrough and extending coaxially with each of the bolt insertion holes so as to tighten up and fixedly secure the block between the leg portions by a bolt and nut unit.

4 Claims, 7 Drawing Figures

CONNECTING ROD MADE OF FIBER REINFORCED PLASTIC MATERIAL

BACKGROUND OF THE INVENTION

1. Field of the Invention

This invention relates to a connecting rod, and more particularly to a connecting rod of a fiber reinforced plastic material.

2. Description of the Prior Art

The connecting rods which have so far been employed are constructed as disclosed in the Japanese Laid-open Publication Nos. 56-155122 and 56-157420 of Japanese Utility Model Applications, such that the body of connecting rod has a bearing hole for a piston pin of a small diameter formed at one end thereof into which is inserted the piston pin and, at the other end thereof, is provided with a semi-circular recess forming a half part of a bearing hole for a crankshaft of a larger diameter connected to the crankshaft and with a block having a semi-circular recess corresponding to said recess and fixedly secured to the other end of the body by tightening up a pair of bolts thereby defining a crankshaft bearing hole. The purpose of this is to allow a back pressure to be exerted on the crankshaft bearing hole in the longitudinal direction of the rod member.

Accordingly, it is necessary to form longitudinally extending holes in the connecting rod body on both sides of the recess thereof and on both sides of the block (that is; in the critical part of the connecting rod). Therefore, in the case where the connecting rod is formed by a fiber reinforced plastic material, the fiber itself is interrupted or cut off by the bolt insertion holes to thereby reduce the effective sectional area of the critical part of the connecting rod and both ends of the fiber in the vicinity of the bolt insertion holes are cut off. Consequently, the load caused by tightening up the bolts and that due to the inertia force exerted in the crankshaft bearing hole portion will be borne by the shearing strength of the carbon fiber reinforced plastic material in the periphery of the recess on the side of the crankshaft bearing hole and also in the periphery of the recess on the side of the block. Therefore, there is a risk that the fiber reinforced plastic material cannot endure the loads caused on the crankshaft bearing hole portion with the result that the connecting rod is damaged or broken.

SUMMARY OF THE INVENTION

The present invention has been contemplated in view of the foregoing circumstances, and has for its object to provide a connecting rod made of a fiber reinforced plastic material wherein the mechanical strength of the portion of the rod on both sides of the crankshaft bearing hole is increased so as to bear the load caused on that portion and to prevent the failure thereof and a back pressure can be exerted in the crankshaft bearing hole in the longitudinal direction of the connecting rod body.

Another object of the present invention is to provide a connecting rod of light weight wherein an inertia force reduction effect and a noise level reduction or suppressing effect resulting from improved vibration attenuation characteristic can be obtained.

In order to obtain the foregoing objects or aspects of the present invention, there is provided a connecting rod comprising a body thereof; one end of the body having a piston pin bearing hole; two leg portions formed in forked configuration at the other end of the body and having a recess of semi-circular cross-section formed on one side of an intermediate groove defined between the leg portions, the leg portions respectively having oppositely located bolt insertion holes formed in the leading ends thereof; a block adapted to be fitted in the other side of the intermediate groove and having a semi-circular recess defining a crankshaft bearing hole in opposed relationship with said semi-circular recess formed on one side of the intermediate groove, the block having a bolt insertion hole formed therethrough and extending coaxially with each of the bolt insertion holes formed in the leg portions; a bolt adapted to be passed through said three bolt insertion holes; and a nut for tightening up and fixedly securing said block between said two leg portions in co-operation with the bolt.

In accordance with another aspect of the present invention, there is provided a connecting rod comprising a body thereof; one end of the body having a piston pin bearing hole; two leg portions formed in forked configuration at the other end of the body and having a recess of semi-circular cross section formed on one side of an intermediate groove defined between the leg portions, the leg portions respectively having oppositely located bolt insertion holes formed in the leading ends thereof; a block adapted to be fitted in the other side of the intermediate groove and having a semi-circular recess defining a crankshaft bearing hole in opposed relationship with said semi-circular recess formed on one side of the intermediate groove, the block having a bolt insertion hole formed therethrough and extending coaxially with each of the bolt insertion holes formed in the leg portions, respectively, and notches respectively formed in both open ends of the bolt insertion hole thereof; a bolt adapted to be passed through said three bolt insertion holes; a nut for tightening up and fixedly securing said block between said two leg portions in co-operation of the bolt; and wedge pieces each being pushed into each of the notches formed in the block by tightening up the nut threadably engaged with the bolt thereby pressing the block against the longitudinal inside of the body.

In accordance with a further aspect of the present invention, there is provided a connecting rod wherein a body thereof is made of a fiber reinforced plastic material.

BRIEF DESCRIPTION OF THE DRAWINGS

The above and many other advantages, features and additional objects of the present invention will become apparent to those versed in the art upon making reference to the following detailed description and accompanying drawings in which preferred structural embodiments incorporating the principle of the present invention are shown by way of illustrative examples.

DETAILED DESCRIPTION OF THE PREFERRED EMBODIMENTS

Figure 1:
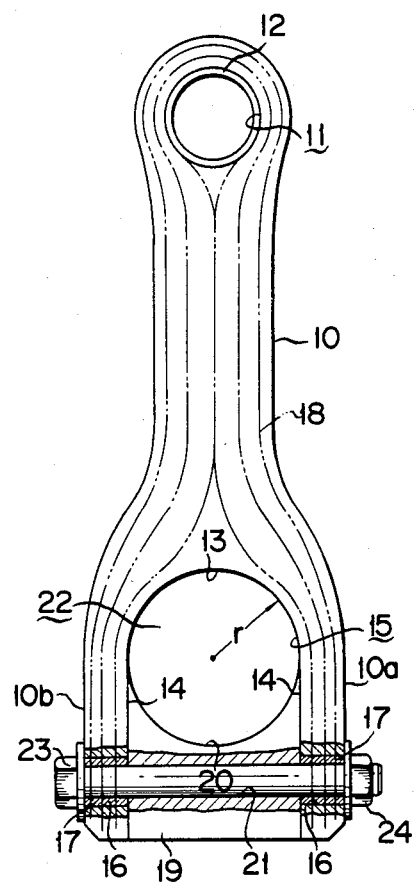
FIG. 1 is a partial sectional front view of a connecting rod according to one embodiment of the present invention.

Formed at one end of a body 10 is a piston pin bearing hole 11 which rotatably supports a piston pin (not shown) and in which a bushing 12 is fitted.

The other end of the above-mentioned body 10 is of forked configuration comprising one leg portion 10a and another leg portion 10b. Formed beween the leg portions 10a and 10b is a groove 15 comprised of a semi-circular recess 13 and opposed faces 14 and 14 in parallel relationship with each other.

Formed in the leg portions 10a and 10b, respectively, at positions nearer to their open ends and away from a circular are with a radius corresponding to the radius γ of the recess 13 are bolt insertion holes 16, 16 which are in opposed relationship and which extend in the direction at right angles to the longitudinal direction of the body 10. Further, fitted in each of the bolt insertion holes 16 and 16 is a metallic insert 17.

The fiber 18 used as the constituent material of the body 10 extends continuously in the longitudinal direction thereof and bend along the periphery of the piston pin bearing hole 11 and the bolt insertion hole 16. Thus, the fiber 18 extends uninterruptedly in the direction of the body 10 thereby to form the body 10.

A metallic block 19 is inserted in the above-mentioned groove 15. The metallic block 19 has a semi-circular recess 20 having a radius substantially equal to the radius of the aforementioned semi-circular recess 13. Further, a hole 21 for the insertion of a bolt is formed opposite to the aforementioned bolt insertion hole 16, and both the semi-circular recess 13 and the recess 20 form a crankshaft bearing hole 22. A nut 24 is threadably engaged with the bolt 23 which passes through the aforementioned bolt insertion hole 16 and is tightened up to fixedly secure the bolt and the nut.

Moreover, the bushing 12 and the insert 17 are embedded into the connecting rod when it is molded of a fiber reinforced plastic material such as for example a carbon fiber reinforced plastic material.

Another embodiment of the present invention will be described below with reference to FIGS. 3 to 7.

Figure 2:
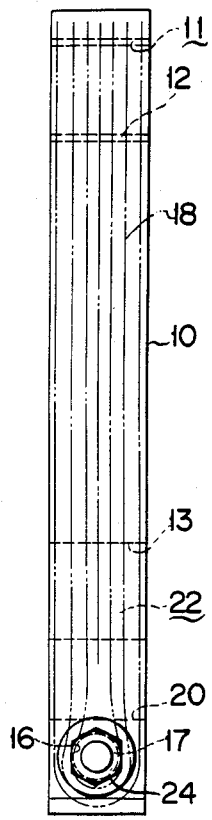
FIG. 2 is a side elevational view of the embodiment shown in FIG. 1.
Figure 3:
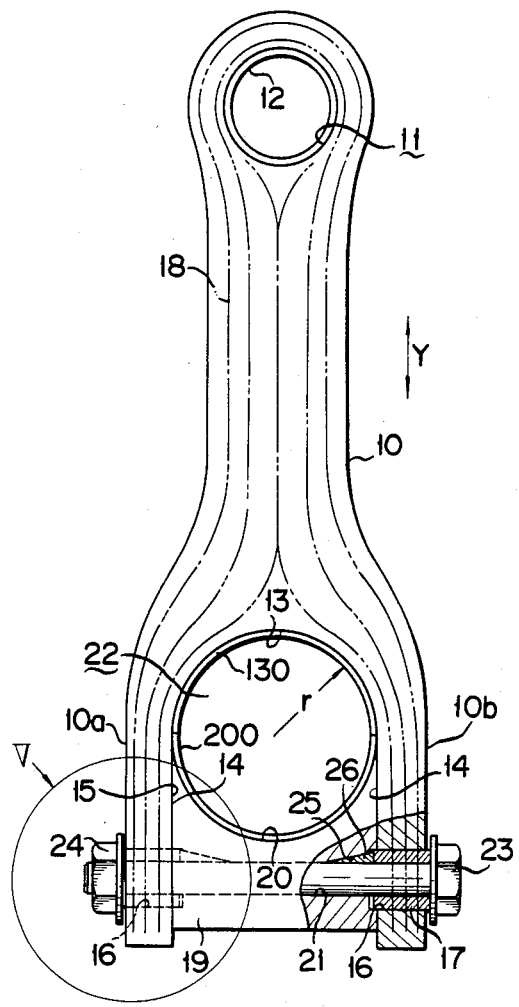
FIG. 3 is a partial sectional front view of a connecting rod according to another embodiment of the present invention.
Figure 4:
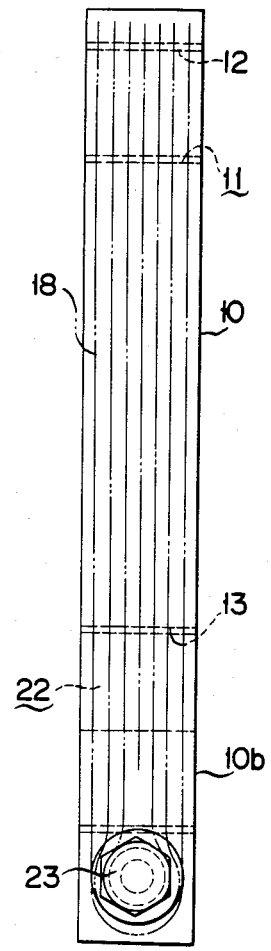
FIG. 4 is side elevational view of the embodiment shown in FIG. 3.
Figure 5:
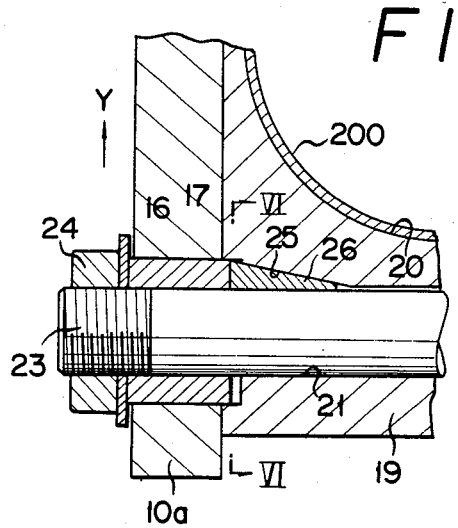
FIG. 5 is an enlarged sectional view of a portion encircled by a dotted circle V in FIG. 3.
Figure 6:
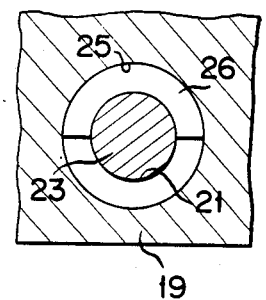
FIG. 6 is a sectional view taken along line VI—VI in FIG. 5.
Figure 7:
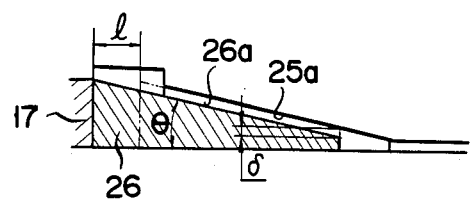
FIG. 7 is a view for explaining the pressing or urging force exerted on the block by the wedge means of the present invention.

This embodiment has the substantially same construction as the first embodiment shown in FIGS. 1 and 2, and like parts are shown by the same reference numerals. This embodiment differs from the first embodiment in that a half-split metal 130 is fitted into the aforementioned semi-circular recess 13, and also a half-split metal 200 is fitted into the semi-circular recess 20 formed in the block 19. Thus, the aforesaid half-split metals 130 and 200 form a crankshaft bearing hole 22. Another difference of this embodiment from the first embodiment resides in that the inside diameter of the bolt insertion hole 21 of the above-mentioned block 19 is larger than the outside diameter of the bolt 23 and the bolt insertion hole 21 has outwardly enlarged semi-circular notches 25 formed in both ends thereof and in each of which is fitted a generally semi-circular wedge piece 26 the inner peripheral surface of which corresponds with the outer peripheral surface of the bolt 23. According to this second embodiment, when the nut 24 is threadably engaged with the bolt 23 and tightened up, the wedge piece 26 is pressed by the insert 17 into the notch 25 so that the outer peripheral surface of the wedge piece 26 may be pressed against the inner wall surface of the notch 25 of the block 19 by a wedging action thus urging the block 19 always towards the semi-circular recess 13 (that is; in the direction shown by arrow Y). In this case, the urging or pressing force exerted by the wedge piece 26 against the block 19 is determined, as shown in FIG. 7, by a difference δ between the inner wall surface 25a of the notch 25 and an outer peripheral surface 26a of the wedge pieces 26, the inclination angle θ of the outer peripheral surface 26a and the amount l of the wedge piece 26 to be pushed in.

Further, the wedge piece 26 and the insert 17 may be formed as an integral unit, and the wedge piece 26 and the notch 25 may be formed in a square shape.

By forming the connecting rod by a fiber reinforced plastic material as mentioned hereinabove, the fiber extends uninterruptedly along the periphery of the crankshaft bearing hole 22 so as to increase the effective sectional area of the connecting rod so that the loading due to the inertia force can be borne by the compression, bending and shearing strength thus increasing the mechanical strength of the rod per se to substantially increase the resistance thereof to failure.

Further, the pushing-in of the metal 130 in the direction shown by arrow Y resulting from pressing of the block 19 by the insertion of the wedge piece 26 into the notch 25 enables a back pressure to be exerted on the crankshaft bearing hole 22 thereby enabling the complete roundness of the metal 130 to be secured.

Furthermore, by forming a connecting rod by a fiber reinforced plastic material, an improved inertia force reduction effect resulting from a reduction in weight and a considerable noise suppressing effect due to improved vibration attenuation characteristics can be expected.

It is to be understood that the foregoing description is merely illustrative of preferred embodiments of the invention, and that the scope of the invention is not to be limited thereto, but is to be determined by the scope of the appended claims.

What is claimed is:

1. A light weight sturdy connecting rod comprising:
   a body;
   one end of the body having a piston pin bearing hole;
   two leg portions formed in forked configuration at the other end of said body and having a recess of semi-circular cross section formed at the end an intermediate groove defined between the leg portions, said leg portions respectively having oppositely located bolt insertion holes formed in the leading ends thereof;
   a block adapted to be fitted between the leg portions of the body and having a semi-circular recess defining a crankshaft bearing hole in opposed relationship with said semi-circular recess formed at the end of the intermediate groove, said block having bolt insertion hole formed therethrough and extending coaxially with each of the bolt insertion holes respectively formed in said leg portions and notches respectively formed in both open ends of said bolt insertion hole thereof;
   a bolt adapted to be passed through said three bolt insertion holes;

a nut for tightening up and fixedly securing said block between said two leg portions in co-operation of the bolt; and wedge pieces each being pushed into each of said notches formed in the block by tightening up said nut threadably engaged with said bolt thereby pressing the block against the longitudinal inside of said body.

2. A connecting rod as claimed in claim 1 wherein said body is made of a fiber reinforced plastic material.

3. A connecting rod as claimed in claim 1 wherein said fiber reinforced plastic material body is a carbon fiber reinforced plastic material.

4. A connecting rod as claimed in claim 1, wherein said block is metal.

* * * * *